(No Model.)
J. H. SHAW.
SNAP HOOK.
No. 553,137. Patented Jan. 14, 1896.
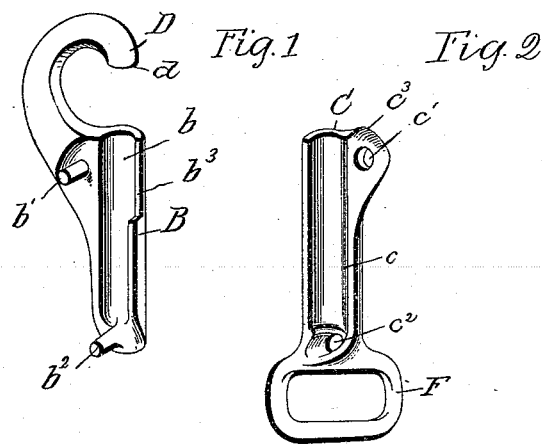
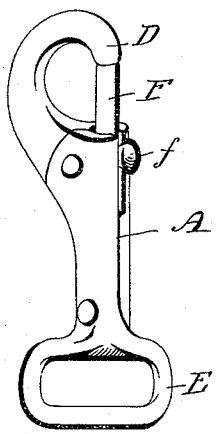
Witnesses:
Chas. B. Shumway
Samuel York Jr.
Inventor
John H. Shaw
by Robinson & Fisher
his attorneys.

UNITED STATES PATENT OFFICE.

JOHN H. SHAW, OF NEW HAVEN, CONNECTICUT, ASSIGNOR TO THE SARGENT & COMPANY, OF SAME PLACE.

SNAP-HOOK.

SPECIFICATION forming part of Letters Patent No. 553,137, dated January 14, 1896.

Application filed April 13, 1895. Serial No. 545,626. (No model.)

*To all whom it may concern:*

Be it known that I, JOHN H. SHAW, a citizen of the United States, and a resident of the city of New Haven, county of New Haven, State of Connecticut, have invented a new and useful Improvement in Snap-Hooks, which is fully set forth in the following specification, taken in connection with the drawings, which form a part thereof, and in which like letters of reference represent like parts in all the figures, and in which—

Figure 1 is a perspective view of one portion of the tubular shank, together with the hook; Fig. 2, a perspective view of the other portion of the shank, together with the eye of the article; Fig. 3, a perspective view of the parts assembled and forming a completed snap-hook.

This invention relates to an improvement in hooks of the class commonly known as "snap-hooks," in which the shank is of tubular form, having the hook at one end and the eye or other device at the opposite end, as a convenience for attaching the hook to the strap, chain, or other article. The tubular shank stands in line with the point of the hook and forms a socket for a bolt arranged with a spring, the tendency of which is to force the bolt toward the nose of the hook to close the opening in the hook, the shank being constructed with a longitudinal slot through which a thumb-piece or button on the bolt projects as a convenient means for operating the bolt.

The object of this invention is a construction which will permit the tubular shank to be formed by casting, so that little or no mechanical work other than that of the mere assembling of the parts is required in the manufacture of the hook. Various methods have been devised for casting the shank without the use of a core and in such form that the parts may be readily assembled, the more usual method being to cast it in two portions, to be subsequently fitted together.

This invention consists of a construction in which the two parts of the tubular shank are cast in simple form, secured together by means described hereinafter, producing thereby a cheap yet thoroughly reliable hook with the least expenditure of time and mechanical labor, all of which is more fully described and claimed hereinafter, together with minor details.

In the snap-hook embodying my invention shown in the drawings, A represents the tubular shank in which are arranged the bolt F (see Fig. 3) and spring, (not shown,) the tension of which constantly presses the bolt F against the nose $d$ of the hook D. The eye, swivel, or other device for uniting the hook to the strap is represented in the drawings by the eye E. A small button $f$ acts as the thumb-piece for operating the bolt and has a longitudinal play in the slot $b^3$.

The method of constructing this snap-hook is to cast the tubular shank A in two parts, dividing it longitudinally, one part, B, cast integral with the hook D of the article, and the other part, C, with the eye E thereof. The two parts of the shank, as shown in the drawings, join each other in the plane of the hook D. The part B of the shank with which the hook D is cast has formed therein the groove $b$ substantially U-shaped in cross-section, one side of which is cut away at $b^3$ to form upon the assembling of the parts the longitudinal slot for the play of the button $f$. Upon the part C of the shank is also formed a groove $c$, and the two grooves $b$ and $c$ form together the cylindrical socket for the bolt and spring of the article. At the base of the hook D is the laterally-extending lug $b'$ adapted to fit into a registered hole $c'$ on the lip or extension $c^3$ formed on the upper end of the portion C of the shank. A second lug $b^2$ at the lower end of the groove $b$ may likewise fit into the registered hole $c^2$ at the lower end of the groove $c$.

When the two parts described above and shown in the Figs. 1 and 2 have been cast, the bolt $f$ and spring are placed in the groove $b$ and the part C of the shank fitted over it with the lugs $b'$ and $b^2$ projecting through the holes $c'$ and $c^2$. The lugs $b'$ and $b^2$ are riveted to form engaging flanges on the part C of the shank, securing the parts of the article together.

The bolt F and button $f$ may be cast integral, and it is evident that by this construction no core is necessary in casting, and all the parts are simple in construction. The casting accomplished, mechanical labor is only required for the slight operation of assembling the parts and riveting the lugs, and upon the completion of this the tubular shank is as strong and serviceable as if cast entire, and the entire article cheap in construction, but perfectly reliable in use.

The formation of this snap-hook may be varied by reversing the hook and eye and the location of the lugs and holes, or the grooves in the two parts of the shank may be equalized without departing from the spirit of my invention.

I am aware that the tubular shank has been cast in two parts, one of which is formed integral with the hook and the other with the eye of the article, as shown in United States Patent No. 504,539, granted to A. A. Page, but the peculiar and simple construction of this invention is new, and Therefore what I claim, and desire to secure by Letters Patent, is—

A snap hook consisting of an eye and hook; a chambered shank formed in two sections, one formed integral with said eye, and the other with said hook; lug perforations, one at the lower end of the eye section of the chambered shank, and the other through a lateral extension on the upper end thereof; lateral lugs at the lower end of the hook section of said shank, and at the base of the hook adapted to engage in said lug perforations, in which they are secured, substantially as described.

In witness whereof I have hereunto set my hand this 5th day of April, 1895.

JOHN H. SHAW.

Witnesses:
E. R. SARGENT,
CLAIRE E. PLATT.